May 3, 1938.  A. E. ROBINSON  2,116,281
BATHTUB STEAM ELIMINATOR
Filed Nov. 4, 1937
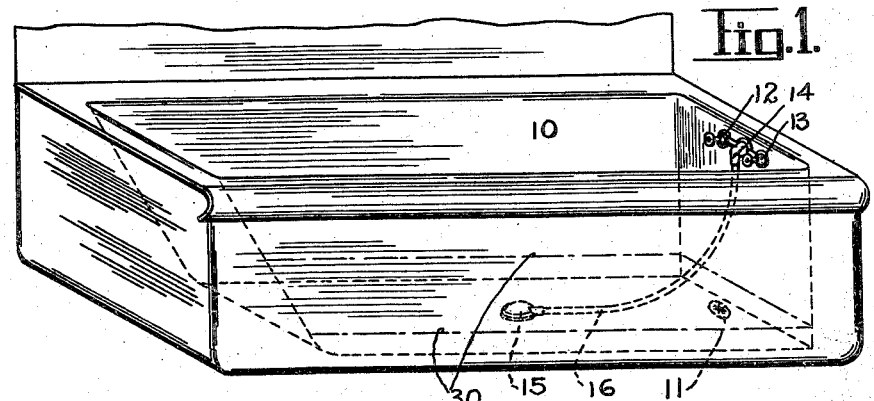
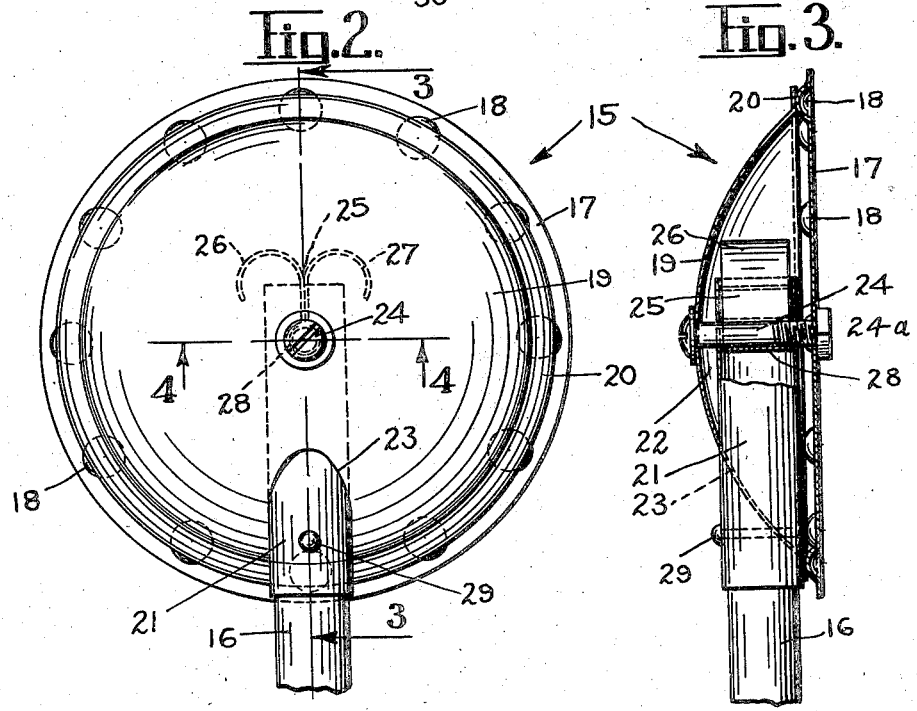
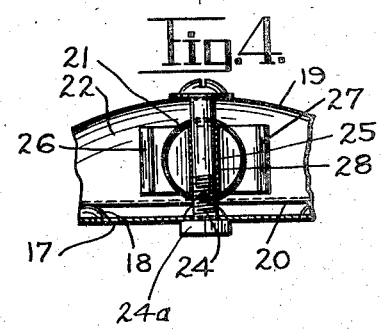
INVENTOR
Albert E. Robinson.
BY H. G. Manning
ATTORNEY Patented May 3, 1938

2,116,281

UNITED STATES PATENT OFFICE 2,116,281

BATHTUB STEAM ELIMINATOR

Albert E. Robinson, Torrington, Conn.

Application November 4, 1937, Serial No. 172,749

9 Claims. (Cl. 137—111)

This invention relates to bathroom accessories, and more particularly to a device which is adapted to eliminate the cloud of steam, which usually rises from the stream of hot water flowing into a bathtub, by conducting said stream of hot water beneath the surface of the water already in the tub and thoroughly mixing it therewith.

One object of this invention is to provide a device of the above nature which may be readily attached to and detached from a hot water faucet.

A further object is to provide a device of the above nature for causing the hot water to flow silently into the tub, and which will prevent the excessive humidity in the bathroom.

A still further object is to provide a device of the above nature which will be simple in construction, inexpensive to manufacture, readily manipulated, compact, ornamental in appearance, and very efficient and durable in use.

With these and other objects in view, there has been illustrated on the accompanying drawing one form in which the invention may be conveniently embodied in practice.

In the drawing:

Fig. 1 is a perspective view on a reduced scale showing the steam eliminator as it appears when installed in a bathtub.

Fig. 2 is a top plan view of the steam eliminator shown in full scale.

Fig. 3 is a sectional view taken on the line 3—3 of Fig. 2.

Fig. 4 is a broken sectional view taken on the line 4—4 of Fig. 2.

Referring now to the drawing wherein like reference characters indicate the same parts throughout the several views, the numeral 10 designes a bathtub having the usual outlet drain 11, and hot and cold water outlet faucets 12 and 13, herein shown as joined to a mixing faucet nozzle 14. The steam eliminator of the present invention is generally indicated at 15, and is adapted to be connected to the mixing nozzle 14 by a length of rubber tubing 16. The steam eliminator 15 is preferably constructed of non-rustable metal, and includes a flat circular base plate or disc 17 having a plurality of spaced-apart protuberances or hollow bumps 18 struck upward from its upper surface and arranged in a circle adjacent to the peripheral edge thereof. The base plate is surmounted by a circular upwardly domed cover plate 19, which has a flat peripheral edge portion 20, which edge portion 20 is superimposed over the plate 17 and rests upon the bumps 18. It will thus be seen that the edge of the cover plate 19 will be spaced from the plate 17 and will thereby provide a discharge outlet for the water delivered from the rubber hose 16.

The cover plate 19 is provided with a tubular pipe 21 extending into the space 22 below the dome section thereof, and said pipe 21 passes through an opening 23 provided in said cover plate 19. The pipe 21 extends inwardly slightly beyond the common centers of the cover 19 and plate 17, and is held in place by a bolt 24 which passes downwardly through said common centers. A nut 24a is screwed upon the threaded shank of the bolt 24 and engages the undersurface of the bottom plate 17. The bolt 24 securely clamps the cover plate 19 and bottom plate 17 together, and secures the pipe 21 in position.

In order to produce a uniform outward spreading of the water passing into the device from the hose 16, provision is made of a deflector baffle 25 having a pair of oppositely and rearwardly curled wing portions 26 and 27 connected together by a loop portion 28 located within said pipe 21 and which embraces the bolt 24, being locked in position thereby. The curled wing portions 26 and 27 act as baffles to direct the stream of water flowing inwardly from the pipe 21 backwardly into the center of the dome cavity 22, whereby it will fill the same and flow out substantially in equal volumes through the apertures between the bumps 18. The deflection of the water rearwardly by the baffle wings 26 and 27 will cause the water to flow with slightly greater pressure from the discharge apertures adjacent the pipe 16 than at the forward end of the steam eliminator. This will tend to keep the device pushed forwardly in its proper position at the center of the tub at all times. The hose 16 is fitted within the outer end of the pipe 21 and is secured thereto in any suitable manner, as by a headed pin or rivet 29.

Operation

In operation, the steam eliminator is first attached by means of the hose tube 16 to the mixing nozzle 14, as shown in Fig. 1, and the device 15 will then be preferably placed adjacent the center of the bathtub 10 with its bottom surface resting flat on the tub and with its domed cover plate 19 uppermost. A sufficient quantity of cold water will then be run into the tub 10 to cover the flat rim 20 of the cover plate 19, as indicated roughly by the dot and dash line 30 in Fig. 1, and then the hot water will be turned on. The hot water flowing through the hose tube 16 and the pipe 21 will be intercepted by the baffle wings 26 and 27 which will spread the water in all directions within the device between the cover 19 and the plate 17, and cause it to emerge substantially uniformly through the apertures at the rim. The hot water will thus be thoroughly mixed with the cold water below the surface thereof without noise or splashing and without the necessity of "paddling" the water by hand. Moreover, since the mixing takes place below the surface of the water, no vapor can escape into the room, but the hot water will be entirely used to heat the cold water in the tube. The bather is thus given a bigger or warmer bath with a given amount of hot water.

One advantage in the use of the present invention is that the humidity in the bathroom will be maintained at a low degree. Condensation upon walls and windows will thus be eliminated, and the bathroom will be kept dry and comfortable, not only for the first bather, but for as many others as may follow.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a bathroom steam eliminator, a flat base plate, an upwardly domed cover superimposed over said plate and connected thereto, spaced means to separate the peripheral edges of said plate and cover and provide water-discharge apertures therebetween, a tubular pipe extending through said cover parallel to said base with its inner end disposed adjacent the center of said plates, and means to connect said pipe to a water supply.

2. In a bathroom steam eliminator, a base plate, an upwardly domed cover superimposed over said plate and connected thereto at the center thereof, spaced means to separate the peripheral edges of said plate and cover to provide a plurality of water-discharge apertures, a tubular pipe extending through said cover parallel to said base with its inner end disposed adjacent the center of said plates, a water deflecting baffle at the inner end of said member arranged to direct water rearwardly over said member to cause a substantially uniform discharge at the periphery of said plates, and means to connect the tubular member to a supply of hot water.

3. In a bathroom steam eliminator, a base plate, an upwardly domed cover superimposed over said plate and connected thereto in spaced relation therewith, said base plate having a plurality of bumps extending upwardly therefrom at its periphery to engage the edge of said cover and space it from said plate, a pipe member entering said cover parallel to said base and having its inner end disposed between said cover and said plate, and a bolt passing through said cover, said pipe member, and said base plate, to secure these parts together.

4. In a bathroom steam eliminator for the purpose described, a base plate, an upwardly domed cover having a flat peripheral edge superimposed over said plate, said plate having a plurality of bumps extending upwardly therefrom about and located adjacent to its periphery for engaging said flat edge to space it from said base plate thereby providing a plurality of spaced apertures for the discharge of water, a pipe member entering said cover and having its inner end disposed in the space between said cover and said plate at a point adjacent the center thereof, a water deflector baffle located beyond the inner end of said pipe in alinement therewith, said baffle being curled backwardly around the end of said pipe, and an attaching bolt passing through said cover, said pipe, and said plate, said deflector being supported within said pipe by said bolt.

5. In a bathroom steam eliminator, a base plate, an upwardly domed cover superimposed upon said plate in spaced relation thereto, a plurality of spacing members located between the edges of said base plate and cover, a pipe member passing into said eliminator and having its inner end disposed between said cover and said plate, a water deflecting baffle having a pair of oppositely curled ends extending out of said pipe member with its curled ends embracing the end of said pipe member, and a bolt passing through said cover, said pipe member, and said plate, to hold them together, and having a portion of said deflecting baffle wrapped thereabout and supported thereby.

6. In a bathroom steam eliminator, a base plate, an upwardly domed cover superimposed over said plate and connected thereto in spaced relation therewith, said base plate having a plurality of bumps extending upwardly therefrom at its periphery to engage the edge of said cover and space it from said plate, a pipe member entering said cover parallel to said base and having its inner end disposed between said cover and said plate, and means passing through the center of said cover, said pipe member, and said base plate, to secure these parts together.

7. In a bathroom steam eliminator for the purpose described, a base plate, an upwardly domed cover having a flat peripheral edge superimposed over said plate, said plate having a plurality of bumps extending upwardly therefrom about and located adjacent to its periphery for engaging said flat edge to space it from said base plate, thereby providing a plurality of spaced apertures for the discharge of water, a pipe member entering said cover and having its inner end disposed in the space between said cover and said plate at a point adjacent the center thereof, a water deflector baffle located beyond the inner end of said pipe in alinement therewith, said baffle being curled backwardly around the end of said pipe, and an attaching bolt passing through said cover, said pipe, and said plate.

8. In a bathroom steam eliminator, a base plate, an upwardly domed cover superimposed upon said plate in spaced relation thereto, a plurality of spacing members located between the edges of said base plate and cover, a pipe member passing into said eliminator and having its inner end disposed between said cover and said plate, a water deflecting baffle having a pair of oppositely curled ends extending out of said pipe member with its curled ends embracing the end of said pipe member, and a bolt passing through said cover, said pipe member, and said plate to hold them together, and having a portion of said deflecting baffle wrapped thereabout and supported thereby, said deflecting baffle having a central loop section embracing said bolt.

9. In a bathroom steam eliminator, a base plate, an upwardly domed cover superimposed upon said plate in spaced relation thereto, a plurality of spacing members located between the edges of said base plate and cover, a pipe member passing into said eliminator and having its inner end disposed between said cover and said plate, a strip metal water deflecting baffle having a pair of oppositely curled ends extending out of said pipe member with its curled ends embracing the end of said pipe member, and a bolt passing through said cover, said pipe member, and said plate to hold them together, and having a portion of said deflecting baffle wrapped thereabout and supported thereby.

ALBERT E. ROBINSON.